US010239365B2

(12) United States Patent
Baker

(10) Patent No.: US 10,239,365 B2
(45) Date of Patent: Mar. 26, 2019

(54) INTEGRATED WIRELESS DATA SYSTEM FOR A VEHICLE WHEEL HUB ASSEMBLY

(71) Applicant: TECAT PERFORMANCE SYSTEMS, LLC, Ann Arbor, MI (US)

(72) Inventor: Douglas Martin Baker, Ypsilanti, MI (US)

(73) Assignee: TECAT PERFORMANCE SYSTEMS, LLC, Ann Arbor, MI (US)

(*) Notice: Subject to any disclaimer, the term of this patent is extended or adjusted under 35 U.S.C. 154(b) by 0 days.

(21) Appl. No.: 15/702,293

(22) Filed: Sep. 12, 2017

(65) Prior Publication Data

US 2018/0072113 A1    Mar. 15, 2018

Related U.S. Application Data

(60) Provisional application No. 62/393,154, filed on Sep. 12, 2016.

(51) Int. Cl.
| | |
|---|---|
| *B60C 23/04* | (2006.01) |
| *F16D 66/00* | (2006.01) |
| *B60T 17/22* | (2006.01) |
| *F16D 66/02* | (2006.01) |

(52) U.S. Cl.
CPC ...... *B60C 23/0408* (2013.01); *B60C 23/0455* (2013.01); *B60T 17/22* (2013.01); *F16D 66/00* (2013.01); *F16C 2326/02* (2013.01); *F16D 66/028* (2013.01); *F16D 2066/001* (2013.01); *F16D 2066/003* (2013.01); *F16D 2066/005* (2013.01)

(58) Field of Classification Search
CPC ..... B60C 23/00; B60C 23/0408; F16D 66/00; F16D 2066/001
See application file for complete search history.

(56) References Cited

U.S. PATENT DOCUMENTS

| | | | | |
|---|---|---|---|---|
| 5,959,365 | A  * | 9/1999 | Mantini | B60C 23/0408 180/197 |
| 8,717,159 | B2 | 5/2014 | Todd et al. | |
| 2002/0039066 | A1* | 4/2002 | Fuller | B60C 23/0408 340/442 |
| 2005/0088321 | A1* | 4/2005 | Weber | G08G 1/123 340/988 |
| 2007/0268128 | A1* | 11/2007 | Swanson | H04Q 9/00 340/539.22 |
| 2014/0025271 | A1* | 1/2014 | Fahland | B60T 1/10 701/70 |
| 2014/0070935 | A1* | 3/2014 | Wang | B60W 40/06 340/443 |

* cited by examiner

*Primary Examiner* — Hongmin Fan
(74) *Attorney, Agent, or Firm* — John S. Artz; Dickinson Wright PLLC

(57) ABSTRACT

The present disclosure generally relates to an integrated wireless data system and method for mounting the system on one or more components within a vehicle wheel hub assembly for measuring operational data relating to the condition or status of a brake rotor or other components within a wheel hub assembly, where the integrated wireless data system rotates with the vehicle wheel.

15 Claims, 6 Drawing Sheets

INTEGRATED WIRELESS DATA SYSTEM FOR A VEHICLE WHEEL HUB ASSEMBLY

CROSS REFERENCE TO RELATED APPLICATION

This U.S. Utility application claims the benefit of U.S. Provisional Application Ser. No. 62/393,154 filed Sep. 12, 2016, which is incorporated herein by reference in its entirety.

FIELD OF DISCLOSURE

The present disclosure generally relates to an integrated wireless data system mounted to a vehicle wheel hub assembly and a method for measuring operational data of one or more characteristics within a vehicle wheel hub. For instance, the system may measure brake torque and temperature while the vehicle is operating and therefore the brake rotor is rotating.

BACKGROUND OF THE DISCLOSURE

Vehicle wheel assemblies typically include a brake system with a tire mounted to a rim, brake rotors, and brake calipers, where the brake system is attached to the vehicle suspension system. Brakes turn the kinetic energy of a vehicle's motion into heat, which the brake rotors must then dissipate to the atmosphere. With continued use, the brake system gets hotter and hotter, and as the heat builds up, the vehicle may experience a loss of stopping power and potentially warped brake rotors. Therefore, measuring brake rotor temperature is important in the development of optimized braking systems.

Brake temperature monitoring systems are known. For example, U.S. Pat. No. 8,717,159 to Todd et al. discloses a brake monitoring system and method that incorporates a temperature sensor that measures temperature adjacent to the brake. The system is mounted to the brake caliper housing, and is an integral part of the wheel hub and braking systems that must be assembled together. In addition, it does not directly measure the wheel hub temperatures. This brake monitoring system, and other similar prior art, comprises systems that are wired, and do not rotate with the wheel hub. Consequently, such monitoring systems cannot directly measure the wheel hub temperatures, since the wheel hub is rotating with respect to the monitoring system. In addition, as such systems are an integral part of the wheel hub and braking systems, significant set up time is required for installation.

Thus, there is a need for an improved brake rotor temperature measurement system that is easy to install, and that provides accurate absolute temperature.

SUMMARY AND ADVANTAGES OF THE DISCLOSURE

The present disclosure includes an integrated wireless data system and method for the measurement of wheel hub operational characteristics during real-world operating conditions.

An aspect of the integrated wireless data system may include one or more sensors for measuring operational data of one or more components in a vehicle wheel hub assembly, where one or more of the components are rotating with the wheel hub assembly. The integrated wireless data system may also include a data acquisition system in communication with the integrated wireless data system. The integrated wireless data system may wirelessly transmit the operational data from the one or more sensors to the data acquisition system using radio frequency (RF) transmission. The operational data may include, but is not limited to, mechanical strain, thermal strain, torsional load, change in motion, temperature, and the like.

An aspect of the integrated wireless data system further includes a mounting system for mounting the sensors and data acquisition system to the vehicle wheel hub assembly. The mounting system may include a hub insert that fits into a center hole of the wheel hub assembly and locks into an existing hub taper with sliding pins. The mounting system may also include an electronics enclosure bolted to the hub insert with two bolts. The electronics enclosure may contain slots for access to the one or more externally mounted sensors to be wired to the electronics. The electronics enclosure is lightweight and may also contain a power source for providing power to the integrated wireless data system. The power source is also lightweight and operates under low power consumption so as not to impact the wheel dynamics when the vehicle is operating.

An aspect of the mounting system may also include multiple sizes of the hub insert to accommodate different wheel hub designs and sizes.

An aspect of the integrated wireless data system may also include a method to linearize the output of non-linear thermocouples using real-time calculations.

An aspect of the integrated wireless data system may also include a system and method of energy harvesting to recharge the power source. For example, a vehicle's braking thermal energy or tire bending energy could be used to drive a thermo-electric converter recharging system and store the energy in a battery storage device. In another aspect, axial wheel vibrations could provide energy to a piezoelectric or inductive power solution.

The aspects of the present disclosure are advantageous over the prior art. For example, the entire integrated wireless data system can be mounted from the outside of the vehicle, does not require installation of any wires, and only requires two mounting bolts to attach the system to the vehicle wheel hub assembly. Accordingly, one key advantage may include, but is not limited to, the ease of installation of such a system. Hub inserts can be installed in less than a minute, and can be left inside the wheel hub assemblies. The electronics enclosure is also installed in less than a minute and can be moved from one wheel assembly to another. Furthermore, the measurement system is noninvasive to the system under test, meaning that no alterations to the wheel hub assembly are required to mount or remove the integrated wireless measurement system or the mounting system for the wheel hub assembly. Another advantage of the present disclosure is that the measurement system provides actual, absolute data for the system or component being measured. For example, in one aspect of the disclosure, thermocouples can be mounted directly to the brake rotors for actual brake rotor temperature measurement. Furthermore, the wireless, lightweight and low power design of the electronics enclosure and power source ensures that the integrated wireless data system can be mounted to the wheel hub without impacting the wheel dynamics. In addition, in one aspect of the disclosure using energy harvesting systems, the integrated wireless data system could be used to operate continuously, enabling the system for use as feedback control signals.

BRIEF DESCRIPTION OF THE DRAWINGS

Other aspects of the present disclosure will be readily appreciated, as the same becomes better understood by reference to the following detailed description when considered in connection with the accompanying drawings wherein.

DETAILED DESCRIPTION OF THE PRESENT DISCLOSURE

Detailed aspects of the present disclosure are provided herein; however, it is to be understood that the disclosed aspects are merely exemplary and may be embodied in various and alternative forms. It is not intended that these aspects illustrate and describe all possible forms of the disclosure. Rather, the words used in the specification are words of description rather than limitation, and it is understood that various changes may be made without departing from the spirit and scope of the disclosure. As those of ordinary skill in the art will understand, various features of the present disclosure as illustrated and described with reference to any of the Figures may be combined with features illustrated in one or more other Figures to produce examples of the present disclosure that are not explicitly illustrated or described. The combinations of features illustrated provide representative examples for typical applications. However, various combinations and modifications of the features consistent with the teachings of the present disclosure may be desired for particular applications or implementations. Additionally, the features and various implementing embodiments may be combined to form further examples of the disclosure.

The aspects disclosed herein provide for an integrated wireless data system for measuring operational data of one or more components in a vehicle wheel assembly, where one or more of the components are in rotational motion with the wheel hub assembly. The system may be configured to wirelessly transmit the operational characteristics obtained from one or more sensors to a data acquisition system using radio frequency (RF) transmission. The operational characteristics may include, but is not limited to, mechanical strain, thermal strain, torsional load, wear, change in motion, temperature, any combination thereof, and the like. The operational characteristics may be collected in real-time and may be used to optimize the design of one or more components of the wheel hub assembly. It will be recognized by one skilled in the art that the vehicle wheel hub assembly can have a variety of different configurations and components. For example, different types of suspensions.

Figure 1:
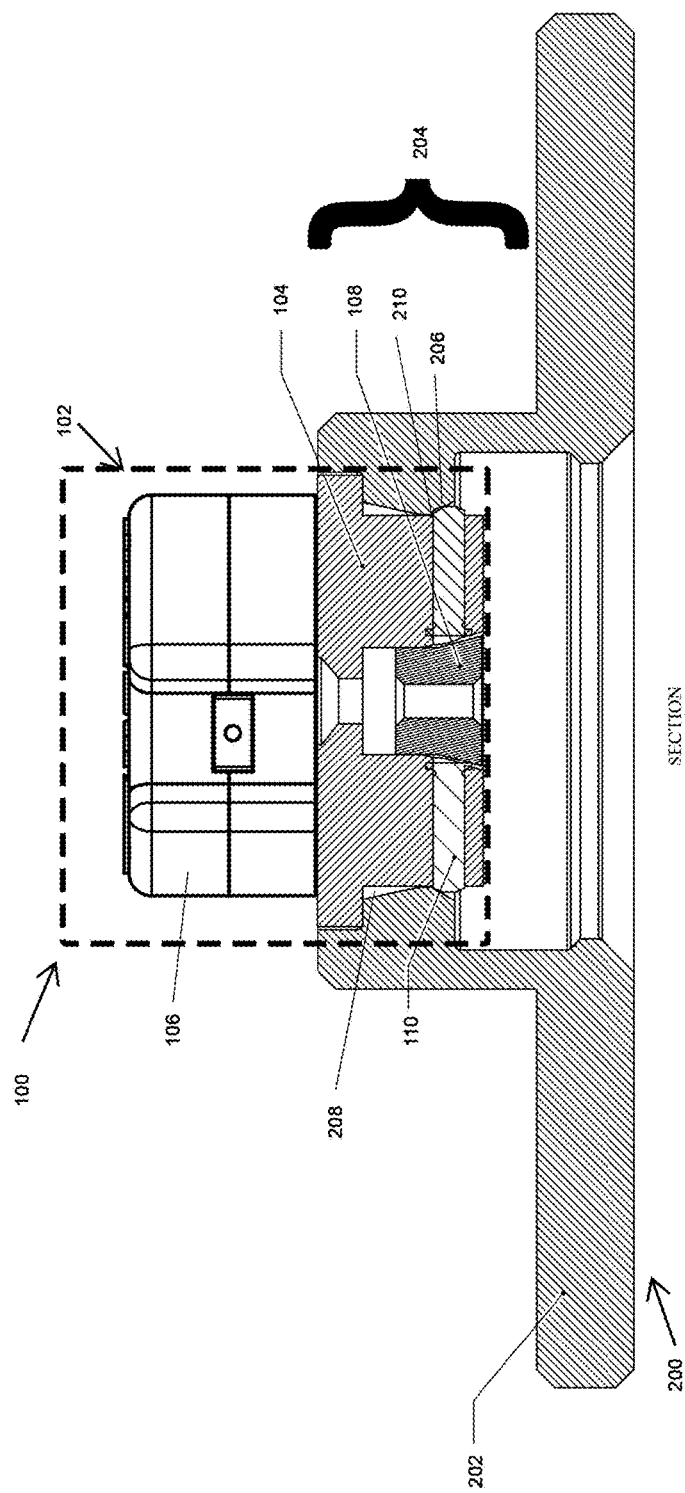
FIG. 1 is a cross-sectional view of an integrated wireless data system mounted to an inside portion of a wheel hub assembly in accordance with an aspect of the present disclosure.

FIG. 1 is a cross-sectional view of an integrated wireless data system 100 mounted to a wheel hub assembly 200 in accordance with an aspect of the present disclosure. The integrated wireless data system 100 is mounted to a hub 202 of the wheel hub assembly 200 and specifically, to an outer portion 204 of the hub 202 through a mount assembly 102. The mount assembly 102 may include a hub insert 104 for mounting the system 100 to the wheel hub assembly 200 and a housing 106, which surrounds and protects the electronic components within the integrated wireless data system 100 from outside elements. The wheel hub 202 may have any geometry or shape typical of a vehicle wheel hub assembly 200. Wheel hub 202 geometries have a tapered portion 206 and a pocket 208. The hub insert 104 may be inserted into the tapered portion 206 and pocket 208 of the wheel hub 202 to mount the integrated wireless data system 100 to the wheel hub assembly 200. In particular, the hub insert 104 may have a threaded draw bar 108 to pull the hub insert 104 into the pocket 208 and to force a pair of sliding pins 110 past the tapered edge 210 of the tapered portion 206, holding the hub insert 104 in place. The housing 106 is then bolted into place onto the hub insert 104.

Figure 2B:
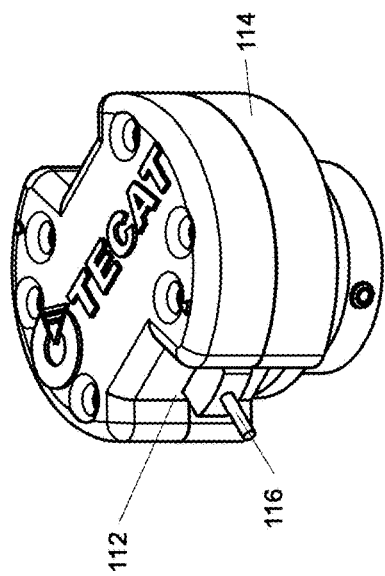
FIG. 2B is an isometric view of an integrated wireless data system in accordance with an aspect of the present disclosure.
Figure 2A:
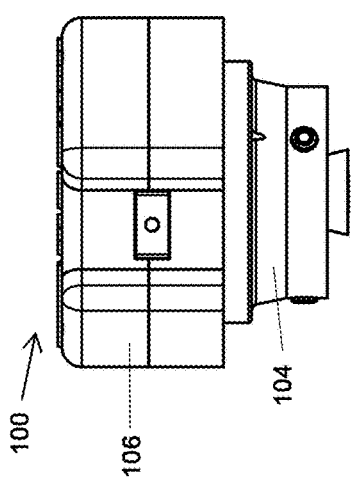
FIG. 2A is a side view of an integrated wireless data system in accordance with an aspect of the present disclosure.

FIG. 2A is a side view of the integrated wireless data system 100 in accordance with an aspect of the present disclosure and FIG. 2B is an isometric view of the integrated wireless data system 100 in accordance with an aspect of the present disclosure. The housing 106 may contain one or more slots 112 formed in the side 114 of the housing 106 for receiving one or more sensors 116. The housing 106 may be built of a lightweight material with high thermal resistance. For instance, the lightweight material may be PA220 nylon or another similar material with comparable density and thermal resistance.

Figure 3:
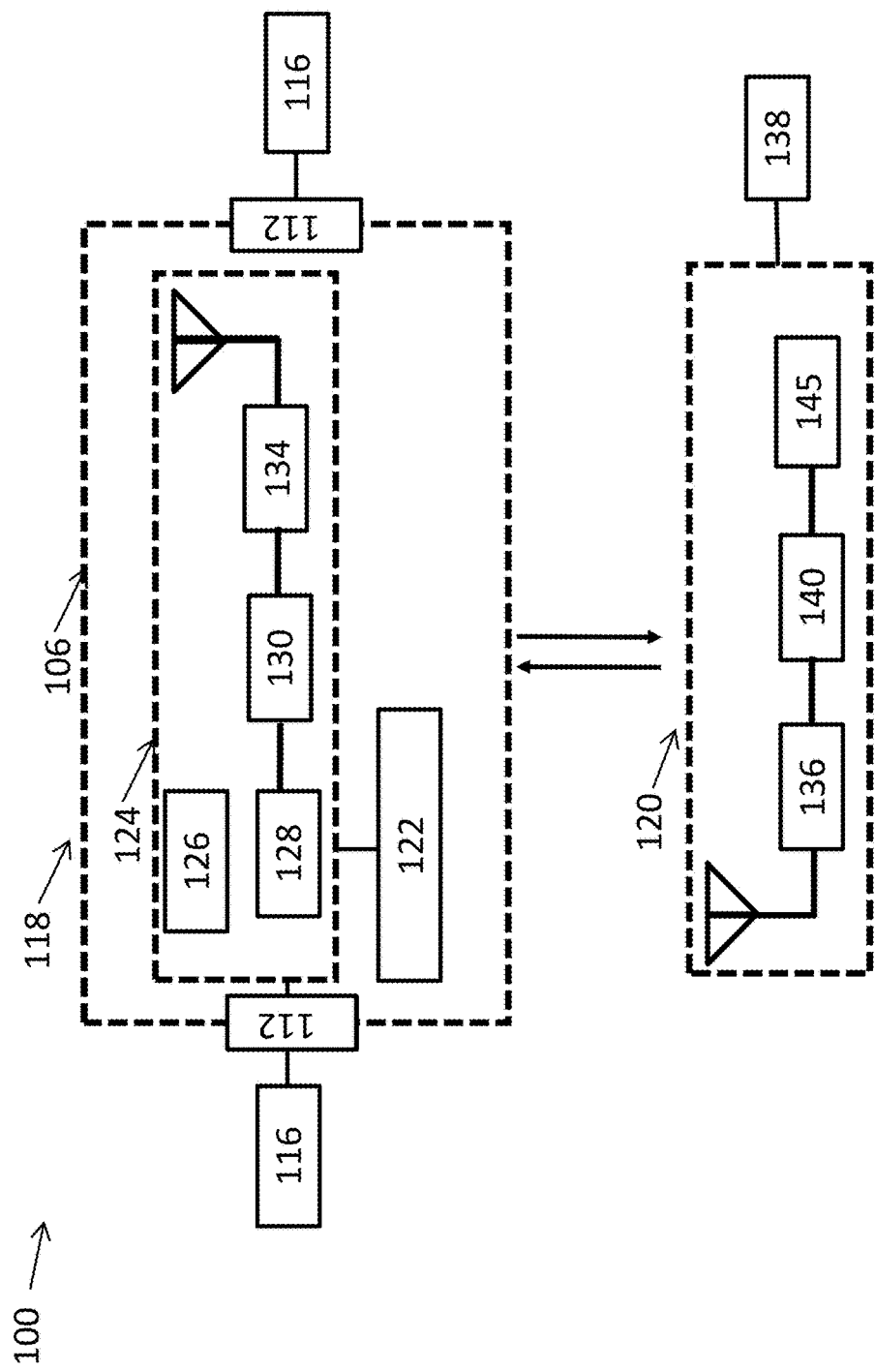
FIG. 3 is a block diagram of the architecture of an integrated wireless data system for measuring operational data of one or more components of a vehicle wheel assembly in accordance with an aspect of the present disclosure.

FIG. 3 is a block diagram of the architecture of an integrated wireless data system 100 for measuring operational characteristics of one or more components of a vehicle wheel assembly (not shown) in accordance with an aspect of the present disclosure. The integrated wireless data system 100 is shown in two parts: (1) a remote unit 118, and (2) a base unit 120. The remote unit 118 and the base unit 120 may be in wireless communication with one another and may transmit operational data via RF transmission.

The remote unit 118 may include the housing 106, which can further include a power source 122 and a circuit board 124. The housing 106 is also connected to the one or more sensors 116, which can include, but is not limited to, an accelerometer, a temperature sensor, and strain gauge connectivity. The one or more sensors 116 may further be connected to a power source 122 and to the circuit board 124. The power source 122 may be, but is not limited to, a battery. Additionally, the remote unit 118 can incorporate an energy harvesting device 126, such as an accelerometer device for harvesting the kinetic energy from the wheel rotations. The energy harvesting device 126 may be mounted to the circuit board 124. The circuit board 124 distributes power to the one or more connected sensors 116 and has a microprocessor 128 and an A/D converter 130 that transforms the one or more sensor data to a digital signal. The circuit board 124 may also contain a transceiver 134 to transmit and receive information (e.g., the sensor data) wirelessly via an RF signal to and from the base unit 120.

A power management strategy for the remote unit 118 is also provided, as it is fundamental to maintaining a lightweight wireless data system capable of transmitting high frequency data. The integrated wireless data system 100 incorporates algorithms, which enable minimal power consumption of the electronics within the housing 106. Accordingly, power demand is extremely low, and the remote unit 118 enters a sleep mode when not in use, further minimizing power consumption. This strategy may be used with the energy harvesting system 126. As discussed above, the energy harvesting system 126 can use kinetic energy from wheel rotations to charge the power source 122.

The base unit 120 can include a transceiver 136, a microprocessor 140, and onboard storage 145. The base unit 120 may also be coupled to a data acquisition system 138. The digital signal from the transceiver 134 in the remote unit 118 is received at the transceiver 136 of the base unit 120. The base unit 120 may be powered by the data acquisition system 138. One skilled in the art will appreciate that there are a wide range of commercially available data acquisition systems 138 that can be configured to supply power to the base unit 120, and to retrieve the data from the base unit 120. The microprocessor 140 can be configured to perform calculations and send data to either or both the onboard storage 145 and the data acquisition system 138.

Because the remote unit 118 contains a transceiver 134 and the base unit 120 contains a transceiver 136, the wireless data system is capable of bi-directional communications. An operator, therefore, can use the data acquisition system 138 to alter data acquisition parameters while still testing. These parameters may include, for example, altering the data acquisition rate. One skilled in the art can appreciate that there are circumstances in vehicle testing that demand high speed data, but that it may be undesirable to obtain high speed throughout the duration of the test. Bi-directional communications enable changing the data acquisition parameters while the wheel is still rotating, without the need to physically access the remote unit.

Figure 4B:
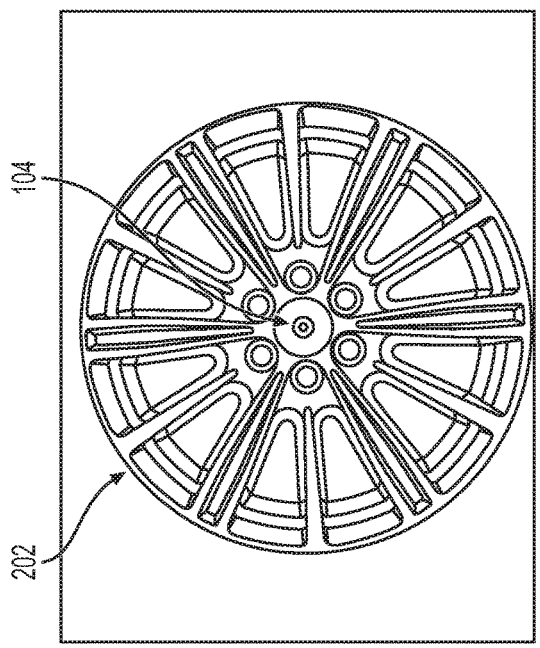
FIGS. 4A and 4B are illustrations of an exterior side view and an interior side view respectively, of a wheel hub assembly with a hub insert.
Figure 4A:
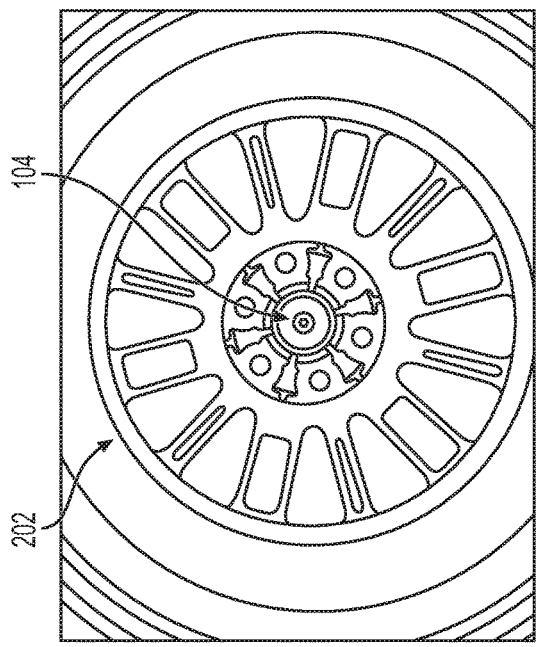

FIGS. 4A and 4B are illustrations of an exterior side view and an interior side view respectively, of a wheel hub 202 with a hub insert 104.

Figure 5:
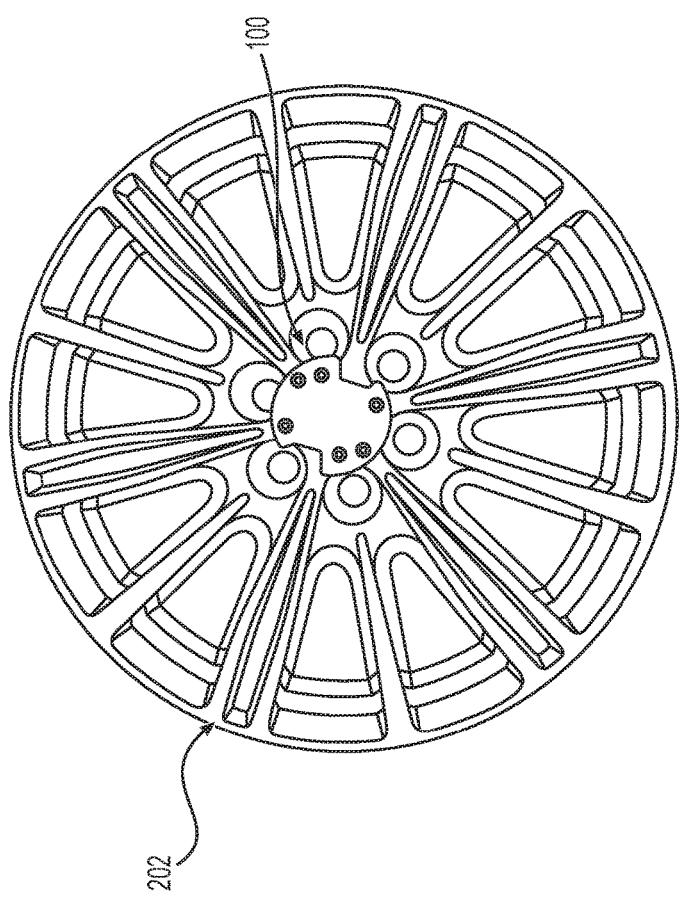
FIG. 5 is an illustration of an integrated wireless data system mounted on a wheel hub assembly in accordance with an aspect of the present disclosure.

FIG. 5 is an illustration of an integrated wireless data system 100 mounted on a wheel hub 202 in accordance with an aspect of the present disclosure. Specifically, FIG. 5 shows the wheel hub 202 of FIG. 4A and with the integrated wireless data system 100 installed on the hub insert 104 via two mounting bolts.

Figure 6:
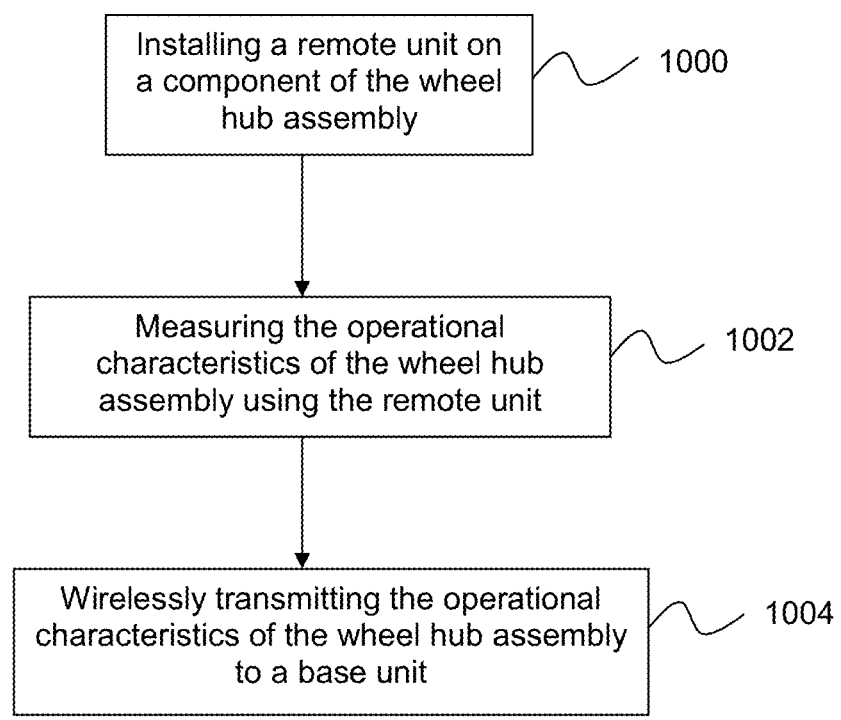
FIG. 6 is a flowchart of a method for collecting wheel hub operational characteristics in accordance with an aspect of the present disclosure.

FIG. 6 illustrates a method for measuring wheel hub operational characteristics under real-world operating conditions in accordance with the present disclosure. The method begins with the step of 1000 installing a remote unit 118 on a component of the wheel hub assembly 200. The method continues with the step of 1002 measuring the operational characteristics of the wheel hub assembly 200 using the remote unit 118. The method concludes by 1004 wirelessly transmitting the operational characteristics of the wheel hub assembly 200 to a base unit 120. The base unit 120 can be installed inside the vehicle, for example. Additionally, the base unit 120 may be connected to a data acquisition system 138, as discussed above. Data acquisition parameters may be specified using the data acquisition system 138. Data is collected under real-world operation conditions.

The foregoing disclosure has been illustrated and described in accordance with the relevant legal standards, it is not intended that these examples illustrate and describe all possible forms of the present disclosure, thus the description is exemplary rather than limiting in nature. Variations and modifications to the disclosed examples may become apparent to those skilled in the art and fall within the scope of the present disclosure. Additionally, the features and various implementing examples may be combined to form further examples of the present disclosure.

What is claimed is:

1. An integrated wireless data system for measuring operational characteristics of a wheel hub assembly in a vehicle, comprising:
    a remote unit having at least one sensor and a remote transceiver and an A/D converter and a microprocessor for measuring operational data of the wheel hub assembly;
    said remote unit including a power source connected to and providing power to said remote unit;
    a base unit having a base transceiver and a microprocessor connected to and in communication with a data acquisition system;
    said remote unit and base unit wirelessly communicating with one another to exchange the operational data in real-time and bi-directionally;
    said remote unit including a housing and a hub insert coupled to said housing and extending along an axis and radially to an outer periphery and configured to engage a tapered portion and a pocket of a wheel hub and defining a central through hole disposed centrally about the axis and extending axially through said hub insert and said hub insert defining at least one radial opening extending radially from the central through hole to the outer periphery;
    said hub insert includes a threaded draw bar disposed in said central through hole; and
    said hub insert includes at least one sliding pin disposed in said at least one radial opening and having a first end adjacent said threaded draw bar and a second end adjacent the tapered portion of the wheel hub and configured to be forced radially outwardly into engagement with the tapered portion in response to engagement by said threaded draw bar as said threaded draw bar pulls said hub insert into the pocket.

2. The system of claim 1, wherein said remote unit includes a power management strategy for optimizing a life of said power source, including a sleep mode for said remote unit when said remote unit is not in use.

3. The system of claim 2, wherein said remote unit contains an energy harvesting device to charge said power source and further prolong the life of said power source.

4. The system of claim 3, wherein said energy harvesting device is selected from a group consisting of a thermoelectric converter and a piezoelectric power converter.

5. The system of claim 1, wherein said remote unit is mounted on the wheel hub assembly.

6. The system of claim 5, wherein said at least one sensor includes a thermocouple mounted to a brake rotor coupled to the wheel hub assembly and connected to said remote unit, wherein said remote unit is configured to measure a temperature of the brake rotor.

7. The system of claim 1 wherein said base unit is adapted to send a signal to said remote unit to alter data acquisition parameters of the operational data.

8. The system of claim 1, wherein said base unit includes onboard storage to store the operational data for later analysis.

9. The system of claim 1, wherein said hub insert is configured to be left in the wheel hub and said housing is configured to be selectively removable from said hub insert while said hub insert remains in the wheel hub.

10. The system of claim 1, wherein said at least one sensor is selected from a group consisting of a mechanical strain sensor, a thermal strain sensor, a torsional load sensor, a wear sensor, and a change in motion sensor.

11. A method for measuring operational characteristics of a wheel hub assembly under real-world operating conditions, comprising the steps of:
    installing a remote unit on a wheel hub assembly;
    pulling a hub insert of the remote unit into a pocket of the wheel hub assembly using a threaded draw bar;
    forcing at least one sliding pin of the hub insert radially outwardly into engagement with a tapered portion of the wheel hub assembly in response to engagement by the threaded draw bar as the threaded bar pulls the hub insert into the pocket;
    measuring the operational characteristics of the wheel hub assembly using the remote unit; and
    wirelessly transmitting the operational characteristics of the wheel hub assembly to a base unit.

12. The method of claim 11 wherein the component of the wheel hub assembly is the wheel hub.

13. The method of claim 11, wherein the base unit is located within the vehicle.

14. The method of claim 11, further including the steps of:
    leaving the hub insert in the wheel hub assembly; and
    removing a housing of the remote unit selectively coupled to the hub insert from the hub insert.

15. A method to configure an integrated wireless data system including a base unit in wireless communication with a remote unit and said base unit connected to data acquisition system to collect operational characteristics of the wheel hub assembly, comprising the steps of:
    installing the remote unit to the wheel hub assembly;
    pulling a hub insert of the remote unit into a pocket of the wheel hub assembly using a threaded draw bar;
    forcing at least one sliding pin of the hub insert radially outwardly into engagement with a tapered portion of the wheel hub assembly in response to engagement by the threaded draw bar as the threaded bar pulls the hub insert into the pocket;
    collecting data associated with the operational characteristics using the remote unit and the base unit of the integrated wireless data system; connecting the base unit to a data acquisition system; and
    configuring the data acquisition system to store the collected data for processing.

* * * * *